US012668690B2

(12) United States Patent    (10) Patent No.:   US 12,668,690 B2

Berger et al.    (45) Date of Patent:   Jun. 30, 2026

(54) ARTICLES WITH HIGH RIGIDITY AND LOW WARPAGE COMPRISING HETEROPHASIC PROPYLENE POLYMER COMPOSITION AND USES THEREFOR

(71) Applicant: Borealis AG, Vienna (AT)

(72) Inventors: Friedrich Berger, Linz (AT); Juliane Braun, Linz (AT); Daniela Mileva, Linz (AT); Anton Sageder, Linz (AT); Claudia Kniesel, Linz (AT)

(73) Assignee: BOREALIS GMBH, Vienna (AT)

( * ) Notice: Subject to any disclaimer, the term of this patent is extended or adjusted under 35 U.S.C. 154(b) by 829 days.

(21) Appl. No.: 17/619,013

(22) PCT Filed: Jun. 12, 2020

(86) PCT No.: PCT/EP2020/066323

§ 371 (c)(1),
(2) Date: Dec. 14, 2021

(87) PCT Pub. No.: WO2020/254206

PCT Pub. Date: Dec. 24, 2020

(65) Prior Publication Data

US 2022/0298341 A1    Sep. 22, 2022

(30) Foreign Application Priority Data

Jun. 17, 2019   (EP) ..................................... 19180557

(51) Int. Cl.
*C08L 23/12*    (2006.01)
(52) U.S. Cl.
CPC .................................... *C08L 23/12* (2013.01)
(58) Field of Classification Search
CPC ................. C08L 23/12; C08L 2205/03; C08L 2205/035; C08L 2207/02; C08L 2308/00; C08L 2314/02; C08L 23/142; C08L 23/16; C08F 210/06; C08F 2/001; C08F 4/6465; C08F 4/651; C08F 4/6541; C08F 210/16; C08F 2500/12; C08F 2500/15; C08F 2500/17

See application file for complete search history.

(56) References Cited

U.S. PATENT DOCUMENTS

2015/0057408 A1 * 2/2015 Eckmayr ................. C08L 23/10
525/240

FOREIGN PATENT DOCUMENTS

| | | | | |
|---|---|---|---|---|
| EP | 1818365 A1 * | 8/2007 | ............ | C08F 297/08 |
| EP | 3115379 A1 * | 1/2017 | ............. | C08F 10/02 |
| WO | 0068315 A1 | 11/2000 | | |
| WO | 2018006149 A1 | 1/2018 | | |

OTHER PUBLICATIONS

International Search Report for PCT Application No. PCT/EP2020/066323 dated Sep. 2, 2020.

* cited by examiner

*Primary Examiner* — Kumar R Bhushan

(74) *Attorney, Agent, or Firm* — Lippes Mathias LLP

(57) ABSTRACT

The present invention is directed to articles comprising a heterophasic polypropylene composition. The polypropylene composition comprises a heterophasic propylene copolymer which comprises a) a matrix phase (A) comprising at least one propylene homopolymer and/or a propylene copolymer, and b) a disperse phase (B) comprising a propylene copolymer rubber dispersed in the matrix phase (A), wherein the propylene copolymer rubber of the disperse phase (B) has a comonomer content of 30 to 55 wt. %, wherein the weight ratio of the matrix phase (A) and the disperse phase (B) is from 20:80 to 80:20; and the polypropylene composition has (i) a melt flow rate MFR2 of 1 g/10 min to 500 g/10 min, determined according to ISO 1133 (230° C., 2.16 kg load); and the article has (ii) a half-time of crystallisation t1/2 of 1 to 25 msec, measured at 80° C. by fast scanning calorimeter.

17 Claims, 2 Drawing Sheets

ARTICLES WITH HIGH RIGIDITY AND LOW WARPAGE COMPRISING HETEROPHASIC PROPYLENE POLYMER COMPOSITION AND USES THEREFOR

CROSS REFERENCE TO RELATED APPLICATIONS

This is a 371 of PCT Application No. PCT/EP2020/066323, filed Jun. 12, 2020, which claims the benefit of European Application No. 19180557.1, filed Jul. 4, 2020, the contents of which are incorporated herein in their entirety.

The present invention relates to articles with high rigidity and increased dimensional stability comprising a heterophasic polypropylene composition. The articles exhibit very short half-time of crystallisation $t_{1/2}$. The invention further relates to a process for preparing such a heterophasic polypropylene composition and its use for e.g. molded articles, in particular injection molded articles such as thin-walled containers.

BACKGROUND OF THE INVENTION

High stiffness, good dimensional stability, fast cycle times are important requirements for polypropylene (PP) based products especially in the rigid packaging area. Addition of nucleating agents is known in the art as a useful tool to change the crystallization kinetic of semicrystalline polymers, the crystallization temperature, crystallinity and decrease of the spherulitic size due to high nucleation density (M. Gahleitner, et al., *Nucleation of Polypropylene Homo- and Copolymers*, Intern. Polym. Proc. 26, 2-20 (2011) and J. C. Wittmann, B. Lotz, *Epitaxial crystallization of polymers on organic and polymeric substances*. Prog. Polym. Sci. 15 909-948 (1990)). As a main effect the rigidity, transparency, dimensional stability and cycle time of the nucleated polymer can be controlled. However, compounds used as heterogeneous nucleating agents differ widely in their effectiveness (M. Gahleitner, et al., *Crystallinity-based product design: Utilizing the polymorphism of isotactic polypropylene homo- and copolymers*. International Polymer Processing. 31, 5, 618-627 (2016) and J. T. Wittmann, B. Lotz, *Epitaxial crystallization of polymers on organic and polymeric substances*, Prog. Polym. Sci. 15 909-948 (1990)).

Polymeric nucleating agents (PNA) are considered as a class of nucleating agents on its own with very high efficiency. Poly(vinylcyclohexane) (PVCH) with high melting temperature (Tm>400° C.) is used to nucleate isotactic polypropylene (iPP) in its alpha-form [D. Alcazar, J. Ruan, A. Thierry, B. Lotz, Polysynthetic twinning in poly(vinyl-cyclohexane) single crystals and "fractional" secondary nucleation in polymer crystal growth, Macromolecules, 39, 1008-1019 (2006); D. Alcazar, J. Ruan, A. Thierry, B. Lotz, Structural matching between the polymeric nucleating agent isotactic poly(vinylcyclohexane) and isotactic polypropylene. Polymer, 39, 2832-2840 (2006)]. The nucleation efficiency of PVCH strongly depends on the catalyst system used.

U.S. Pat. No. 4,551,501 A discloses a crystalline propylene polymer composition having excellent transparency and rigidity comprising a blend of crystalline polypropylene with a polymer of a vinyl cycloalkane having at least 6 carbon atoms. The composition contains 0.05 weight ppm to 10,000 weight ppm of the vinyl cycloalkane unit.

Specific heterophasic propylene copolymers (HECOs) are particularly suitable for thin wall applications. In cases where the article is exposed to extremely fast solidification rate warpage can be observed which is disadvantageous when producing articles like containers in food or medical applications. Warpage is a distortion where the surfaces of the molded part do not follow the intended shape of the design. Warpage of the article results from molded-in residual stresses, which in turn is caused by differential shrinkage of material. If the shrinkage throughout the part is uniform, the molding will not deform or warp, it simply becomes smaller [J. Fischer, Handbook of moulded parts; Shrinkage and Warpage, eBook ISBN: 9781455730575 (2012)]. A further drawback causing differential shrinkage could be non-uniform solidification throughout the part.

WO 2008/074423 A1 discloses a heterophasic polypropylene composition with a high melt flow rate for processability, a good stiffness and an improved compression performance. These compositions may be employed for the production of moulded articles, in particular injection moulded articles such as thin-walled plastic cups. However, the disclosed compositions are produced in the presence of phthalate-containing Ziegler-Natta polymerisation catalysts. These phthalate-containing compositions are under suspicion of generating negative health and environmental effects.

EP 2 960 279 A1 discloses a nucleated polypropylene composition comprising at least one propylene homopolymer wherein the nucleated polypropylene composition and/or the propylene homopolymer can be free of phthalic acid esters as well as their decomposition products. The disclosed nucleated polypropylene composition and articles produced thereof fulfil higher stiffness-impact-requirements and may be used for the manufacture of packaging articles, e.g. thin walled containers.

WO 2016/055361 A1 discloses a new method for preparation of alpha-nucleated propylene homopolymer or random copolymer compositions based on polymeric nucleating agents at high cooling rates which leads to alpha-nucleated polypropylene compositions having increased solidification temperatures suitable for extruded articles, such as films, coatings, fibers, woven or non-woven applications. The compositions may be prepared in the presence of phthalate-free polymerisation catalysts. However, these compositions still possess a high crystallisation half time at 80° C. of at least 50 msec or more which is not suitable for fast solidification applications.

OBJECTS OF THE INVENTION

Thus, articles based on heterophasic polypropylene compositions are desired which combine high stiffness, good dimensional stability, low shrinkage and reduced warpage properties and fast cycle times. Such articles should be highly suitable especially in the rigid packaging area.

Therefore, there is a need for an improved article comprising a heterophasic polypropylene composition which fulfils the above requirements and is especially suitable for injection molded applications, particularly thin wall injection molded applications. It is a further object to provide a multi-stage process for the preparation of such heterophasic polypropylene compositions having the above mentioned unique property balance.

SUMMARY OF THE INVENTION

The present invention is based on the finding that the above objects can be achieved by an article comprising a heterophasic polypropylene composition which is characterized by a specific design of matrix phase and elastomeric phase and exhibits improved stiffness/impact balance, shrinkage and warpage properties, and decreased half-time of crystallisation $t_{1/2}$. The article is further characterized by shorter cycle times and excellent dimensional stability.

Thus, the present invention discloses an article comprising a polypropylene composition comprising a heterophasic propylene copolymer which comprises:

a) a matrix phase (A) comprising at least one propylene homopolymer and/or a propylene copolymer, and b) a disperse phase (B) comprising a propylene copolymer rubber dispersed in the matrix phase (A), wherein the propylene copolymer rubber of the disperse phase (B) has a comonomer content of from 30 to 55 wt. %, wherein the weight ratio of the matrix phase (A) and the disperse phase (B) is from 20:80 to 80:20; and the polypropylene composition has:

(i) a melt flow rate $MFR_2$ of 1 g/10 min to 500 g/10 min, determined according to ISO 1133 (230° C., 2.16 kg load); and the article has:

(ii) a half-time of crystallisation $t_{1/2}$ of 1 to 25 msec, measured at 80° C. by fast scanning calorimeter as described in the method section below.

The article according to the present invention exhibits superior nucleation efficiency, dimensional stability and reduced warpage due to the nucleated heterophasic polypropylene composition. The superior nucleation efficiency reduces significantly the cycle times and warpage in molding applications, especially thin wall injection molding applications.

Preferably, the polypropylene composition has a melt flow rate $MFR_2$ of 3 to 200 g/10 min, more preferably of 10 to 90 g/10 min, determined according to ISO 1133 (230° C., 2.16 kg load).

The propylene copolymer rubber of the disperse phase (B) may preferably have a comonomer content of from 32 to 52 wt. %, more preferably from 33 to 50 wt. %. The article according to the present invention preferably has a half-time of crystallisation $t_{1/2}$ of 5 to 22 msec, more preferably of 8 to 20 msec, measured at 80° C. by fast scanning calorimeter as described in the method section below.

The article according to the present invention may further preferably have a half-time of crystallisation $t_{1/2}$ of 1 to 42 msec, more preferably of 8 to 42 msec, even more preferably 15 to 40 msec, measured at 40° C. by fast scanning calorimeter as described in the method section below.

The present invention is further directed to a process for the production of such a polypropylene composition as defined above, comprising the following stages (i) and (ii) in any sequence:

(i) preparation of the matrix phase of the heterophasic propylene copolymer of the polypropylene composition, wherein stage (i) comprises the following steps:

B2) polymerisation of propylene to afford a propylene homopolymer, or the co-polymerisation of propylene with an alpha-olefin comonomer to result in a propylene copolymer, step B2 being conducted in at least one slurry phase reactor, and B3) polymerisation of propylene to afford a propylene homopolymer, or the co-polymerisation of propylene with an alpha-olefin comonomer to result in a propylene copolymer, step B3 being conducted in at least one gas phase reactor, (ii) preparation of the disperse phase of the heterophasic propylene copolymer of the polypropylene composition, wherein stage (ii) comprises the following step:

B4) co-polymerisation of propylene with an alpha-olefin comonomer to result in an olefin-propylene copolymer, step B4 being conducted in at least one gas phase reactor, and wherein:

a) the process B2 is conducted at a reactor temperature of between 70 and 110° C., b) the process B3 is conducted at a reactor temperature of between 70 and 110° C., and c) the process B4 is conducted at a reactor temperature of between 70 and 110° C.

More specifically, the heterophasic polypropylene composition is prepared in the presence of a phthalate-free catalyst system.

The present invention is further directed to the use of the above heterophasic polypropylene composition for the production of molded articles, preferably injection moulded articles, and more preferably thin wall molded articles.

DETAILED DESCRIPTION OF THE INVENTION

Figure 1:
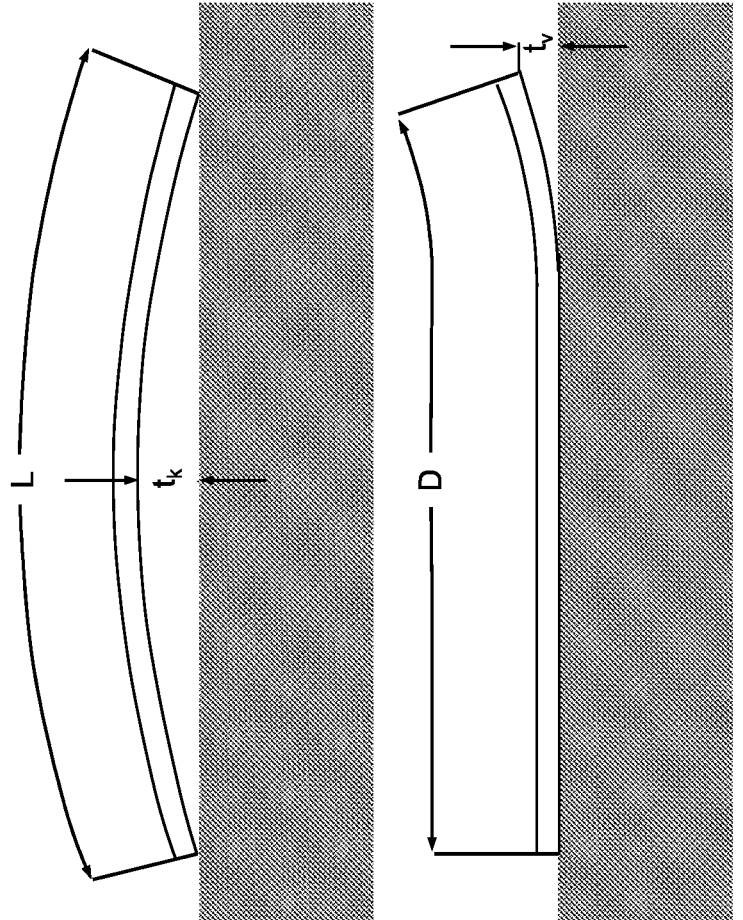
FIG. 1 illustrates the warp and twist determination according to IPC-TM-650 as described in detail in the method section below.

Preferred embodiments of the present invention are described below.

The article according to the present invention may preferably comprise a heterophasic propylene copolymer, wherein the comonomer of the propylene copolymer rubber of the disperse phase (B) is an ethylene or a $C_4$ to $C_{10}$ alpha-olefin or any combination thereof.

The article according to the present invention may preferably comprise a heterophasic propylene copolymer, wherein the total comonomer content of the heterophasic propylene copolymer is from 2.5 to 15.0 wt. %, determined by FTIR calibrated with $^{13}$C-NMR.

The article according to the present invention may preferably comprise a heterophasic propylene copolymer, wherein the propylene copolymer rubber of the disperse phase (B) is a unimodal or bimodal composition.

The article according to the present invention may preferably comprise a heterophasic propylene copolymer, which is nucleated with a nucleating agent.

The article according to the present invention may preferably comprise a heterophasic propylene copolymer having an amount of xylene cold solubles (XCS) in the range of from 10 to 30 wt. %, determined according to ISO 16152: 2005.

The article to the present invention may preferably comprise a heterophasic propylene copolymer, wherein the intrinsic viscosity (IV) of the xylene cold solubles fraction (XCS) is from 1.2 to 4.5 dl/g.

The article according to the present invention may preferably comprise a heterophasic propylene copolymer having a melting temperature ($T_m$) in the range of from 161 to 167° C. and/or a crystallization temperature ($T_c$) of greater than 125° C., $T_m$ and $T_c$ being measured by differential scanning calorimetry (DSC).

The article according to the present invention may preferably have a tensile modulus, determined according to ISO 527-2:2012-06 (cross head speed: 1 mm/min.), in the range of from 1200 to 2200 MPa.

The article according to the present invention may preferably have a Charpy notched impact strength at 23° C., determined according to ISO 179 1 eA, of at least 5.5 kJ/m².

The above polypropylene composition is particularly suitable for the production of molded articles, preferably injection moulded articles. More preferably, the above polypropylene composition may be used for the production of rigid thin wall molded articles which have improved impact, shrinkage and warpage behavior.

(A) Heterophasic Propylene Copolymer (HECO)

As described above, the polypropylene composition of the present invention comprises a heterophasic propylene copolymer (HECO) comprising at least a matrix (A) comprising at least one propylene homopolymer and/or a propylene copolymer and a disperse phase (B) comprising a propylene copolymer rubber dispersed in the matrix phase (A).

The HECO may preferably comprise, based on the total amount of the HECO, 70.0 to 100.0 wt. % of matrix (A) which may preferably be a propylene homopolymer (H-PP) with a $MFR_2$, (230° C., 2.16 kg, ISO 1133) of from 40-800 g/10 min, preferably 60-700 g/10 min, more preferably 80-500 g/10 min.

According to the present invention, the expression "propylene homopolymer" relates to a polypropylene that consists substantially, i.e. of at least 99.0 wt %, more preferably of at least 99.5 wt. %, still more preferably of at least 99.8 wt. %, like at least 99.9 wt. %, of propylene units. In another embodiment only propylene units are detectable, i.e. only propylene has been polymerised.

In one preferred embodiment the matrix polypropylene (PP) comprises three polypropylene fractions (PP1), (PP2), and (PP3). In this case the matrix (M), i.e. the polypropylene (PP) of the heterophasic propylene copolymer (HECO) comprises, preferably consist of:

(a-1) a first polypropylene fraction (PP1) being a first propylene homopolymer (H-PP1) or a first random propylene copolymer (R-PP1), (a-2) a second polypropylene fraction (PP2) being a second propylene homopolymer (HPP2) or a second random propylene copolymer (R-PP2), (a-3) a third polypropylene fraction (PP3) being a third propylene homopolymer (H-PP3) or a third random propylene copolymer (R-PP3), whereby at least one of the three fractions (PP1), (PP2) and (PP3) is a propylene homopolymer, preferably at least the first polypropylene fraction (PP1) is a propylene homopolymer, more preferably the first polypropylene fraction (PP1) and the second polypropylene fraction (PP2) are propylene homopolymers and most preferably all three propylene fractions (PP1), (PP2) and (PP3) are propylene homopolymers.

In Embodiment 1, the three polypropylene fractions (PP1), (PP2), and (PP3) differ from each other by the melt flow rate $MFR_2$ (230° C.) measured according to ISO 1133. One of the three polypropylene fractions (PP1), (PP2), and (PP3), preferably the third polypropylene fraction (PP3), may have a melt flow rate $MFR_2$ (230° C.) measured according to ISO 1133 in the range of 10 to 180 g/10 min, preferably in the range of 30 to 150 g/10 min, still more preferably in the range of 50 to 130 g/10 min. Still more preferably the polypropylene fraction with the above melt flow rate ranges, is the polypropylene fraction with the lowest melt flow rate $MFR_2$ (230° C.) of the three polypropylene fractions (PP1), (PP2) and (PP3), preferably of all polypropylene fractions present in the polypropylene (PP). Accordingly, in one preferred embodiment the third polypropylene fraction (PP3) has the lowest melt flow rate $MFR_2$ (230° C.) of the three polypropylene fractions (PP1), (PP2), and (PP3), wherein the melt flow rate $MFR_2$ (230° C.) measured according to ISO 1133 of the third polypropylene fraction (PP3) is in the range of 10 to 180 g/10 min, preferably in the range of 30 to 150 g/10 min, still more preferably in the range of 50 to 130 g/10 min.

In addition to the preference that one of the three polypropylene fractions (PP1), (PP2) and (PP3) may have a melt flow rate $MFR_2$ (230° C.) measured according to ISO 1133 within the above ranges, it is preferred that another fraction of the three polypropylene fractions (PP1), (PP2) and (PP3) has a melt flow rate $MFR_2$ (230° C.) measured according to ISO 1133 in the range of 80.0 to 500.0 g/10 min, preferably in the range of 120.0 to 450.0 g/10 min, more preferably in the range of 150.0 to 450.0 g/10 min. Particularly the first polypropylene fraction (PP1) has a melt flow rate $MFR_2$ (230° C.) measured according to ISO 1133 in the range of 80.0 to 500.0 g/10 min, preferably in the range of 120.0 to 450.0 g/10 min, more preferably in the range of 150.0 to 450.0 g/10 min.

In one preferred embodiment the remaining polypropylene fraction of the three polypropylene fractions (PP1), (PP2) and (PP3), preferably the second polypropylene fraction (PP2), has a melt flow rate $MFR_2$ (230° C.) measured according to ISO 1133 in the range of 10.0 to 300.0 g/10 min, preferably in the range of 20.0 to 250.0 g/10 min, more preferably in the range of 30.0 to 200.0 g/10 min.

Thus, the matrix (M) of Embodiment 1 may be multimodal, e.g. trimodal. It preferably contains the three fractions (PP1), (PP2), and (PP3) in certain amounts. Fraction (PP1) is preferably present in an amount of 30.0 to 45.0 wt %, fraction (PP2) is preferably in present in an amount of 25.0 to 40.0 wt % and fraction (PP3) present in an amount of in 5.0 to 20.0 wt %, all weight percentages related to the matrix and summing up to 100% of the matrix.

In a further preferred embodiment the matrix (M) comprises two polypropylene fractions (PP1) and (PP2). In this case the matrix (M), i.e. the polypropylene (PP) of the heterophasic propylene copolymer (HECO) comprises, preferably consist of:

(a-1) a first polypropylene fraction (PP1) being a first propylene homopolymer (H-PP1) or a first random propylene copolymer (R-PP1) and (a-2) a second polypropylene fraction (PP2) being a second propylene homopolymer (HPP2) or a second random propylene copolymer (R-PP2), whereby at least one of the two fractions (PP1) and (PP2) is a propylene homopolymer, preferably at least the first polypropylene fraction (PP1) is a propylene homopolymer, more preferably the first polypropylene fraction (PP1) and the second polypropylene fraction (PP2) are propylene homopolymers.

The polypropylene constituting the matrix in this case can be unimodal or multimodal, e.g. bimodal. If the matrix is bimodal the first polypropylene fraction (PP1) and the second polypropylene fraction (PP2) differ at least in their melt flow rate, optionally also in their comonomer content. According to one preferred embodiment, the melt flow rate of the (PP1) fraction is higher than the melt flow rate of the (PP2) fraction, the ratio MFR(PP1)/MFR(PP2) being in the range of 2 to 10.

The propylene homo- or copolymer (PP) constituting the matrix for Embodiment 1 or Embodiment 2 may be produced by a single- or multistage process polymerization of propylene or propylene with alpha-olefin and/or ethylene such as bulk polymerization, gas phase polymerization, solution polymerization or combinations thereof, using conventional catalysts. A homo- or copolymer can be made either in loop reactors or in a combination of loop and gas phase reactors. Those processes are well known to the skilled person.

Preferably, the final melt flow rate of the heterophasic propylene copolymer (HECO) is adjusted during the polymerization process. Accordingly, the reactor-made heterophasic propylene copolymer (HECO) has the melt flow rate as defined above or in the claims. "Reactor-made heterophasic propylene copolymer (HECO)" denotes herein that the melt flow rate of the heterophasic propylene copolymer (HECO) has not been modified on purpose by post-treatment. Accordingly, in preferred embodiments the heterophasic propylene copolymer (HECO) is non-visbroken, particularly not visbroken using peroxide. Accordingly, the melt flow rate is not increased by shortening the chain length of the heterophasic propylene copolymer (HECO) according to this invention by use of peroxide. Thus, it is preferred that the heterophasic propylene copolymer (HECO) does not contain any peroxide and/or decomposition product thereof.

The heterophasic propylene copolymer may preferably have a melting temperature ($T_m$) in the range of from 160 to 170° C., more preferably 162 to 168° C. and/or a crystallization temperature ($T_c$) of greater than 125° C., more preferably from 126 to 140° C., even more preferably 127 to 135° C., such as 128 to 133° C., $T_m$ and $T_c$ being measured by differential scanning calorimetry (DSC).

The heterophasic propylene copolymer (HECO) comprises at least two and optionally three polypropylene fractions (PP1), (PP2), and (PP3).

"Multimodal", like "bimodal" or "trimodal" describes a probability distribution that has several relative maxima. In particular, the expression "modality of a polymer" refers to the form of its molecular weight distribution (MWD) curve, i.e. the appearance of the graph of the polymer weight fraction as a function of its molecular weight. If the polymer is produced in a sequential step process, i.e. by utilizing reactors coupled in serial configuration, and using different conditions in each reactor, the different polymer fractions produced in the different reactors have each their own molecular weight distribution which may considerably differ from one another. The molecular weight distribution curve of the resulting final polymer can be seen as super-imposing of molecular weight distribution curves of the individual polymer fractions which will, accordingly, show distinct maxima, or at least be distinctively broadened compared with the curves for individual fractions. A polymer showing such molecular weight distribution curve is called bimodal, trimodal or multimodal, respectively.

As stated above the matrix (A) is preferably a propylene homopolymer. When the propylene homopolymer matrix phase is unimodal with respect to the molecular weight distribution, it may be prepared in a single stage process e.g. a slurry (or bulk) or gas phase process in a slurry or gas phase reactor. Thus, a unimodal matrix phase may be polymerized in a slurry polymerization step only. Alternatively, the unimodal matrix may be produced in a multistage process (e.g. combination of slurry and gas phase) using at each stage process conditions which result in similar polymer properties.

A multimodal propylene homopolymer matrix may be produced by blending different polymer types, i.e. of different molecular weight and/or comonomer content. However in such a case it is preferred that the polymer components of the polypropylene matrix are produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

As stated above, the propylene homopolymer matrix can be unimodal or multimodal, e.g. bimodal or trimodal.

The propylene copolymer rubber dispersed in the matrix (A) forming the disperse phase (B), described above may preferably be a copolymer of propylene and ethylene and/or an alpha-olefin with 4-10 carbon atoms or any combination thereof, being dispersed in said matrix (A) (i.e. disperse phase), and said propylene copolymer rubber comprises at least one propylene copolymer fraction (EPC1) and optionally a second propylene copolymer fraction (EPC2). Thus, the propylene copolymer rubber dispersed in the matrix (A) may be a unimodal or bimodal composition.

More preferably, the propylene copolymer rubber is a copolymer of propylene and ethylene.

As stated above, the terms "propylene copolymer rubber", "xylene cold soluble (XCS) fraction of the heterophasic propylene copolymer", and "disperse phase" denote the same, i.e. are interchangeable.

Thus the amount of propylene copolymer rubber constitutes the amount of the xylene cold soluble (XCS) fraction of the heterophasic propylene copolymer, determined according to ISO 16152; first edition, 2005-07-01 at 25° C., which is in the range of 10.0 to 30.0 wt %, based on the total amount of the heterophasic propylene copolymer (HECO), preferably in the range of 12.0 to 28.0 wt % and more preferably in the range of 13.0 to 25.0 wt %.

The intrinsic viscosity (IV) of the XCS fraction is from 1.2 to 4.5 dl/g, preferably from 1.5 to 4.5 dl/g, more preferably from 2.0 to 4.0 dl/g, determined according to DIN ISO 1628/1 in decalin at 135° C.

In one embodiment, the disperse phase is unimodal. More particularly, the disperse phase is preferably unimodal in view of the intrinsic viscosity and/or the comonomer distribution. Concerning the definition of unimodal and multimodal, like bimodal, it is referred to the definition above. Preferably, the unimodal disperse phase is made in one reaction stage, more preferably in a gas phase reactor ad comprises, respectively consists of one propylene copolymer fractions (EPC1).

If the propylene copolymer rubber is prepared separately from the polypropylene constituting the matrix, it can be subsequently blended with the matrix polymer by any conventional blending means, e.g. melt blending in an extruder.

Alternatively, the propylene copolymer rubber can be prepared as a reactor blend together with the propylene homo- and/or copolymer (PP) constituting the matrix (A), e.g. starting with the production of the matrix polymer in a slurry, e.g. loop reactor and optionally a gas phase reactor, followed by transferring the product into one or more gas phase reactors, where the propylene copolymer rubber is polymerized.

As described above, the heterophasic propylene copolymer (HECO) of the present invention comprises components (A) which is the matrix phase, and (B) which is the propylene copolymer rubber dispersed in the matrix phase (A), and optional a nucleating agent (C).

The heterophasic propylene copolymer (HECO) according to the present invention apart from the polymeric components and the nucleating agent (C), may comprise further non-polymeric components, e.g. additives for different purposes.

The following are optional additives: process and heat stabilisers, pigments and other colouring agents allowing retaining transparency, antioxidants, antistatic agents, slip agents, antiblocking agent, UV stabilisers and acid scavengers. Depending on the type of additive, these may be added in an amount of 0.001 to 3.0 wt %, based on the weight of the heterophasic propylene copolymer (HECO).

(B) Nucleating Agent

Preferably, the heterophasic polypropylene composition used in the present invention comprises a nucleating agent, preferably an alpha-nucleating agent, more preferably a polymeric alpha-nucleating agent, e.g. a vinylcycloalkane polymer and/or a vinylalkane polymer.

Said preferred polymeric alpha-nucleating agent may be introduced into the composition by blending with a masterbatch (MB) together with e.g. a carrier polymer or during polymerization of the heterophasic propylene copolymer (HECO), preferably, the polymeric alpha-nucleating agent is introduced into the composition by prepolymerizing the catalyst used to prepare a part or all of the heterophasic propylene copolymer (HECO). Any known polymeric alpha-nucleating agent may be employed including polymers of vinyl alkanes and vinyl cycloalkanes. A preferred example of such a polymeric alpha-nucleating agent is a vinyl polymer, such as a vinyl polymer derived from monomers of the formula $$CH_2\!\!=\!\!CH\!\!-\!\!CHR^1R^2$$

wherein $R^1$ and $R^2$, together with the carbon atom they are attached to, form an optionally substituted saturated or unsaturated or aromatic ring or a fused ring system, wherein the ring or fused ring moiety contains four to 20 carbon atoms, preferably 5 to 12 membered saturated or unsaturated or aromatic ring or a fused ring system or independently represent a linear or branched $C_4$-$C_{30}$ alkane, $C_4$-$C_{20}$ cycloalkane or $C_4$-$C_{20}$ aromatic ring. Preferably $R^1$ and $R^2$, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric alpha-nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

In case the alpha-nucleating agent is incorporated into the polypropylene composition in the form of a masterbatch (MB) said polymeric alpha-nucleating agent, which is preferably a vinylcycloalkane, like vinylcyclohexane (VCH), polymer and/or vinylalkane polymer, preferably vinylcyclohexane (VCH), as defined above or below, is preferably present in an amount of not more than 500 ppm, more preferably of 1 to 200 ppm, and still more preferably of 5 to 100 ppm, based on the weight of the master batch (100 wt %). In this embodiment, more preferably, said masterbatch (MB) is present in an amount of not more than 10.0 wt %, more preferably not more than 5.0 wt % and most preferably not more than 3.5 wt %, with the preferred amount of masterbatch (MB) being from 1.5 to 3.5 wt %, based on the total amount of the heterophasic propylene copolymer (HECO). Most preferably the masterbatch (MB) comprises, preferably consists of a homopolymer or copolymer, preferably homopolymer, of propylene which has been nucleated according to BNT-technology as described below.

It is preferred that the alpha-nucleating agent is introduced to the polypropylene composition during the polymerization process of the heterophasic propylene copolymer (HECO). The alpha-nucleating agent is preferably introduced to the heterophasic propylene copolymer (HECO) by first polymerizing the above defined vinyl compound, preferably vinylcycloalkane, as defined above or below, in the presence of a catalyst system comprising a solid catalyst component, preferably a solid Ziegler Natta catalyst component, a co-catalyst and optional external donor, and the obtained reaction mixture of the polymer of the vinyl compound, preferably vinyl cyclohexane (VCH) polymer, and the catalyst system is then used for producing the heterophasic propylene copolymer (HECO). The above incorporation of the polymeric alpha-nucleating agent to the heterophasic propylene copolymer (HECO) during the polymerization of said heterophasic propylene copolymer (HECO) is called herein as BNT-technology as described below. Said obtained reaction mixture is herein below referred interchangeably as modified catalyst system.

Preferably, the polymeric alpha-nucleating agent is vinylcyclohexane (VCH) polymer which is introduced into the heterophasic propylene copolymer (HECO) by the BNT technology. More preferably in this preferred embodiment, the amount of polymeric alpha-nucleating agent, like vinylcyclohexane (VCH), polymer and/or vinylalkane polymer, more preferably of vinylcyclohexane (VCH) polymer, in the heterophasic propylene copolymer (HECO) is not more than 500 ppm, more preferably of 1 to 200 ppm, most preferably 5 to 100 ppm.

With regard to the BNT-technology reference is made to the international applications WO 99/24478, WO 99/24479 and particularly WO 00/68315. According to this technology a catalyst system, preferably a Ziegler-Natta procatalyst, can be modified by polymerizing a vinyl compound having the formula $CH_2\!\!=\!\!CH\!\!-\!\!CHR^1R^2$ as defined above, in the presence of the catalyst system, comprising in particular the Ziegler-Natta procatalyst, an external donor and a co-catalyst. The polymerized vinyl compound acts as an alpha-nucleating agent. The weight ratio of vinyl compound to solid catalyst component in the modification step of the catalyst is preferably of up to 5 (56:1), preferably up to 3 (3:1) most preferably from 0.5 (1:2) to 2 (2:1). The most preferred vinyl compound is vinylcyclohexane (VCH).

When an alpha-nucleating agent is introduced to the heterophasic propylene copolymer (HECO) during the polymerization process, the amount of the alpha-nucleating agent present in the heterophasic propylene copolymer (HECO) is preferably not more than 500 ppm, more preferably is 0.025 to 200 ppm, still more preferably is 1 to 100 ppm, and most preferably is 5 to 100 ppm, based on the heterophasic propylene copolymer (HECO) and the alpha-nucleating agent, preferably based on the total weight of the heterophasic propylene copolymer (HECO) including all additives.

The use of the alpha-nucleating agent in accordance with the present invention enables the preparation of heterophasic propylene copolymer (HECO) having highly satisfactory mechanical properties, i.e. for improved stiffness/impact/toughness balance, so that it is not required for the articles in accordance with the present invention to contain low molecular weight nucleating agents, in particular costly particulate nucleating agents, like organophosphates or soluble nucleants, like sorbitol- or nonitol-derived nucleating agents.

(C) Preparation of the Heterophasic Propylene Copolymer (HECO)

The heterophasic propylene copolymer (HECO) according to the present invention is preferably prepared by a sequential polymerization process, as described below, in the presence of a catalyst system comprising a Ziegler-Natta Catalyst (ZN-C), a co-catalyst (Co) and optionally an external donor (ED), as described below.

The term "sequential polymerization system" according to this invention indicates that the heterophasic propylene copolymer (HECO), preferably nucleated, is produced in at least three reactors connected in series. Accordingly, the present polymerization system comprises at least a pre-polymerization reactor (PR), a first polymerization reactor (R1) and a second polymerization reactor (R2), a third polymerization reactor (R3) and optionally a fourth polymerization reactor (R4). The term "polymerization reactor" shall indicate that the main polymerization takes place.

Preferably, at least one of the two polymerization reactors (R1) and (R2) is a gas phase reactor (GPR). More preferably the second polymerization reactor (R2), the third polymerization reactor (R3) and the optional fourth polymerization reactor (R4) are gas phase reactors (GPRs), i.e. a first gas phase reactor (GPR1) and a second gas phase reactor (GPR2) and a third gas phase reactor (GPR3). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention, the slurry reactor (SR) is preferably a (bulk) loop reactor (LR). In this first polymerization reactor (R1) the first polypropylene fraction (PP1), preferably the first propylene homopolymer fraction (H-PP1), of the matrix polypropylene (PP) is produced.

Preferably, the propylene homopolymer of the first polymerization reactor (R1), i.e. the first propylene homopolymer fraction (H-PP1), more preferably the polymer slurry of the loop reactor (LR) containing the first propylene homopolymer fraction (H-PP1), is directly fed into the second polymerization reactor (R2), i.e. into the (first) gas phase reactor (GPR1), without a flash step between the stages. This kind of direct feed is described in EP 887379 A, EP 887380 A, EP 887381 A and EP 991684 A.

By "direct feed" is meant a process wherein the content of the first polymerization reactor (R1), i.e. of the loop reactor (LR), the polymer slurry comprising the first propylene homopolymer fraction (H-PP1), is led directly to the next stage gas phase reactor.

Alternatively, the propylene homopolymer of the first polymerization reactor (R1), i.e. the first propylene homopolymer fraction (H-PP1), more preferably polymer slurry of the loop reactor (LR) containing the first propylene homopolymer fraction (H-PP1), may be also directed into a flash step or through a further concentration step before fed into the second polymerization reactor (R2), i.e. into the 1% gas phase reactor (GPR1). Accordingly, this "indirect feed"

refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2) and the third polymerization reactor (R3) and any subsequent reactor, for instance, the fourth polymerization reactor (R4) are preferably gas phase reactors (GPRs). Such gas phase reactors (GPR) can be any mechanically mixed or fluid bed reactors. Preferably, the gas phase reactors (GPRS) comprise a mechanically agitated fluid bed reactor with gas velocities of at least 0.2 m/sec. Thus, it is appreciated that the gas phase reactor is a fluidized bed type reactor preferably with a mechanical stirrer.

Thus, in a preferred embodiment the first polymerization reactor (R1) is a slurry reactor (SR), like loop reactor (LR), whereas the second polymerization reactor (R2) and the third polymerization reactor (R3), and the optional fourth polymerization reactor (R4) are gas phase reactors (GPRs).

Accordingly, in the present process at least three, preferably three polymerization reactors (R1), (R2) and (R3) or four polymerization reactors (R1), (R2), (R3) and (R4), namely a slurry reactor (SR), like loop reactor (LR) and a (first) gas phase reactor (GPR1), a second gas phase reactor (GPR2), and optionally a third gas phase reactor (GPR3) connected in series are used.

Prior to the slurry reactor (SR) a pre-polymerization reactor is placed. As the process covers also a pre-polymerization step, all of the Ziegler-Natta catalyst (ZN-C) is fed in the pre-polymerization reactor. Subsequently the pre-polymerization product containing the Ziegler-Natta catalyst (ZN-C) is transferred into the first polymerization reactor (R1).

Especially good results are achieved in case the temperature in the reactors is carefully chosen. Accordingly it is preferred that the operating temperature in the first polymerization reactor (R1) is in the range of 62 to 85° C., more preferably in the range of 65 to 82° C., still more preferably in the range of 67 to 80° C.

Alternatively or additionally to the previous paragraph it is preferred that the operating temperature in the second polymerization reactor (R2) and in the third reactor (R3) and the optional the fourth reactor (R4) is in the range of 75 to 95° C., more preferably in the range of 78 to 92° C.

Preferably, the operating temperature in the second polymerization reactor (R2) is equal to or higher than the operating temperature in the first polymerization reactor (R1). Accordingly, it is preferred that the operating temperature (a) in the first polymerization reactor (R1) is in the range of 62 to 85° C., more preferably in the range of 65 to 82° C., still more preferably in the range of 67 to 80° C., like 70 to 80° C.; and (b) in the second polymerization reactor (R2) is in the range of 75 to 95° C., more preferably in the range of 78 to 92° C., still more preferably in the range of 78 to 88° C., with the proviso that the operating temperature in the in the second polymerization reactor (R2) is equal or higher to the operating temperature in the first polymerization reactor (R1).

Typically, the pressure in the first polymerization reactor (R1), preferably in the loop reactor (LR), is in the range from 20 to 80 bar, preferably 30 to 70 bar, like 35 to 65 bar, whereas the pressure in the second polymerization reactor (R2), i.e. in the (first) gas phase reactor (GPR1), and in any subsequent reactor, like in the third polymerization reactor (R3), e.g. in the second gas phase reactor (GPR2), or in a fourth polymerization reactor (R4), e.g. in the third gas phase reactor (GPR3) is in the range from 5 to 50 bar, preferably 10 to 40 bar. Preferably, hydrogen is added in each polymerization reactor in order to control the molecular weight, i.e. the melt flow rate MFR.

Preferably, the average residence time is rather long in the polymerization reactors (R1) and (R2). In general, the average residence time (1) is defined as the ratio of the reaction volume (VR) to the volumetric outflow rate from the reactor (Qo) (i.e. VR/Qo), i.e T=VR/Qo [tau=VR/Qo]. In case of a loop reactor the reaction volume (VR) equals to the reactor volume.

Accordingly, the average residence time (1) in the first polymerization reactor (R1) is preferably at least 5 min, more preferably in the range of 15 to 80 min, still more preferably in the range of 20 to 60 min, like in the range of 24 to 50 min, and/or the average residence time (1) in the second polymerization reactor (R2) is preferably at least 70 min, more preferably in the range of 70 to 220 min, still more preferably in the range of 80 to 210 min, yet more preferably in the range of 90 to 200 min, like in the range of 90 to 190 min. Preferably the average residence time (1) in the third polymerization reactor (R3) or in the fourth polymerization reactor (R4)—if present—is preferably at least 30 min, more preferably in the range of 30 to 120 min, still more preferably in the range of 40 to 100 min, like in the range of 50 to 90 min.

As mentioned above, the preparation of the heterophasic propylene copolymer (HECO) comprises in addition to the (main) polymerization of the propylene polymer in the at least three polymerization reactors (R1, R2, R3 and optional R4) prior thereto a pre-polymerization in a pre-polymerization reactor (PR) upstream to the first polymerization reactor (R1).

In the pre-polymerization reactor (PR) a polypropylene (Pre-PP) is produced. The prepolymerization is conducted in the presence of the Ziegler-Natta catalyst (ZN-C). According to this embodiment the Ziegler-Natta catalyst (ZN-C), the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst (ZN-C), the co-catalyst (Co), and the external donor (ED) are only added in the pre-polymerization reactor (PR).

The pre-polymerization reaction is typically conducted at a temperature of 10 to 60° C., preferably from 15 to 50° C., and more preferably from 20 to 45° C. The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed can be employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor. The precise control of the pre-polymerization conditions and reaction parameters is within the skill of the art.

Due to the above defined process conditions in the pre-polymerization, a mixture (MI) of the Ziegler-Natta catalyst (ZN-C) and the polypropylene (Pre-PP) produced in the prepolymerization reactor (PR) is obtained. Preferably, the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the present invention and within the skilled knowledge.

Accordingly, the propylene polymer is preferably produced in a process comprising the following steps under the conditions set out above:

a) In the pre-polymerization, a mixture (MI) of the Ziegler-Natta catalyst (ZN-C) and the polypropylene (Pre-PP) produced in the pre-polymerization reactor (PR) is obtained. Preferably, the Ziegler-Natta catalyst (ZN-C) is (finely) dispersed in the polypropylene (Pre-PP). Subsequent to the pre-polymerization, the mixture (MI) of the Ziegler-Natta catalyst (ZNC) and the poly-propylene (Pre-PP) produced in the pre-polymerization reactor (PR) is transferred to the first reactor (R1). Typically, the total amount of the polypropylene (Pre-PP) in the final heterophasic propylene copolymer (HECO) is rather low and typically not more than 5.0 wt %, more preferably not more than 4.0 wt %, still more preferably in the range of 0.5 to 4.0 wt %, like in the range 1.0 of to 3.0 wt %.

b) In the first polymerization reactor (R1), i.e. in a loop reactor (LR), propylene is polymerized, obtaining a first propylene homopolymer fraction (H-PP1) of the propylene homopolymer (HPP), transferring said first propylene homopolymer fraction (H-PP1) to a second polymerization reactor (R2), c) in the second polymerization reactor (R2) propylene is polymerized in the presence of the first propylene homopolymer fraction (H-PP1), obtaining a second propylene homopolymer fraction (H-PP2) of the propylene homopolymer. Said fraction [H-PP1+H-PP2] is further transferred to a third polymerization reactor R3 obtaining a either a third propylene homopolymer fraction (H-PP3) or a first propylene copolymer fractions (EPC1) in the presence of all fractions produced in earlier steps.

Optionally, it is possible to transfer the entire polymer produced to a fourth polymerization reactor R4, i.e. either [H-PP1+H-PP2+H-PP3] or [H-PP1+H-PP2+EPC1], obtaining either a first propylene copolymer fractions (EPC1) or a second propylene copolymer fraction (EPC2) in the presence of all fractions produced in earlier steps.

Consequently, the preferably nucleated polymer produced may comprise the following fractions:

(i) the polypropylene (Pre-PP) produced in the pre-polymerization reactor (PR)+a first propylene homopolymer fraction (H-PP1)+a second propylene homopolymer fraction (H-PP2)+a propylene copolymer fractions (EPC1) or (ii) the polypropylene (Pre-PP) produced in the pre-polymerization reactor (PR)+a first propylene homopolymer fraction (H-PP1)+a second propylene homopolymer fraction (H-PP2)+a third propylene homopolymer fraction (H-PP3)+a propylene copolymer fractions (EPC1) or (iii) the polypropylene (Pre-PP) produced in the prepolymerization reactor (PR)+a first propylene homopolymer fraction (H-PP1)+a second propylene homopolymer fraction (H-PP2)+a first propylene copolymer fractions (EPC1)+a second propylene copolymer fractions (EPC2).

By using—as stated above—a loop reactor and at one or two gas phase reactor in serial configuration and working at different conditions, a multimodal (e.g. bimodal or trimodal) propylene homopolymer matrix (A) can be obtained. If the loop reactor and the first gas phase reactor are run under conditions yielding similar polymers, a unimodal matrix can be obtained.

A preferred multistage process is a "loop-gas phase" process, as developed by Borealis (known as BORSTAR® technology) and is described e.g. in patent literature, such as in EP 0 887 379, WO 92/12182 WO 2004/000899, WO 2004/111095, WO 99/24478, WO 99/24479 or in WO 00/68315. A further suitable slurry-gas phase process is the Spheripol® process of Basell.

The catalyst components are preferably all introduced to the prepolymerization step. However, where the solid catalyst component (i) and the co-catalyst (ii) can be fed separately it is possible that only a part of the co-catalyst is introduced into the prepolymerization stage and the remaining part into subsequent polymerization stages. Also in such cases it is necessary to introduce so much co-catalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor. The precise control of the prepolymerization conditions and reaction parameters is within the skill of the art.

According to the present invention, the heterophasic propylene copolymer (HECO) is obtained by a multistage polymerization process, as described above, in the presence of a catalyst system. In the process described above a Ziegler-Natta catalyst (ZN-C) for the preparation of the heterophasic polypropylene composition is applied. This Ziegler-Natta catalyst (ZN-C) can be any stereo-specific Ziegler-Natta catalyst (ZN-C) for propylene polymerization, which preferably is capable of catalysing the polymerization and copolymerization of propylene and comonomers at a pressure of 500 to 10.000 kPa, in particular 2.500 to 8.000 kPa, and at a temperature of 40 to 110° C., in particular of 60 to 110° C.

Preferably, the Ziegler-Natta catalyst (ZN-C) comprises a high-yield Ziegler-Natta type catalyst including an internal donor component, which can be used at high polymerization temperatures of 80° C. or more. Such high-yield Ziegler-Natta catalyst (ZN-C) can comprise a non-phthalate based internal donor preferably selected from optionally substituted malonates, maleates, succinates, glutarates, cyclohexene-1,2-dicarboxylates, benzoates, a diether and derivatives and/or mixtures thereof, preferably from citraconates, or a phthalate-based donor, like DEHP, etc., or mixtures therefrom as internal donor (ID). The Ziegler-Natta catalyst (ZN-C) is preferably used in association with an alkyl aluminum co-catalyst (Co) and optionally external donors (ED). As further component in the instant polymerization process an external donor (ED) is preferably present. Suitable external donors include certain silanes, ethers, esters, amines, ketones, heterocyclic compounds and blends of these. It is especially preferred to use a silane. It is most preferred to use silanes of the general formula $$R^a_p R^b_q Si(OR^c)_{4-p-q}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$_2$, (phenyl)Si(OCH$_3$)$_2$ and (cyclopentyl)$_2$Si(OCH$_3$)$_2$, or of general formula $$Si(OCH_2CH_3)_3(NR^3R^4)$$

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the dicyclopentyl dimethoxy silane donor (D-donor) or the cyclohexylmethyl dimethoxy silane donor (C-Donor). In addition to the Ziegler-Natta catalyst (ZN-C) and the optional external donor (ED), a co-catalyst (Co) can be used. The co-catalyst (Co) is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkylaluminum, like triethylaluminum (TEAL), dialkyl aluminum chloride or alkyl aluminum dichloride or mixtures thereof. In one specific embodiment the co-catalyst (Co) is triethylaluminum (TEAL).

Preferably, the ratio between the co-catalyst (Co) and the external donor (ED) [Co/ED] and/or the ratio between the co-catalyst (Co) and the transition metal (TM) [Co/TM] should be carefully chosen. Accordingly, (a) the mol-ratio of co-catalyst (Co) to external donor (ED) [Co/ED] must be in the range of 5 to 45, preferably is in the range of 5 to 35, more preferably is in the range of 5 to 25; and optionally (b) the mol-ratio of co-catalyst (Co) to titanium compound (TC) [Co/TC] must be in the range of above 80 to 500, preferably is in the range of 100 to 350, still more preferably is in the range of 120 to 300.

As mentioned above the Ziegler-Natta catalyst (ZN-C) is preferably modified by the so called BNT-technology during the above described pre-polymerization step in order to introduce the polymeric nucleating agent. Such a polymeric nucleating agent is as described above a vinyl polymer, such as a vinyl polymer derived from monomers of the formula CH$_2$=CH—CHR$^1$R$^2$ as described above.

The weight ratio of vinyl compound to polymerization catalyst in the modification step of the polymerization catalyst preferably is 0.3 or more up to 40, such as 0.4 to 20 or more preferably 0.5 to 15, like 0.5 to 2.0.

The polymerization of the vinyl compound, e.g. VCH, can be done in any inert fluid that does not dissolve the polymer formed (e.g. polyVCH). It is important to make sure that the viscosity of the final catalyst/polymerized vinyl compound/inert fluid mixture is sufficiently high to prevent the catalyst particles from settling during storage and transport.

The adjustment of the viscosity of the mixture can be done either before or after the polymerization of the vinyl compound. It is, e.g., possible to carry out the polymerization in a low viscosity oil and after the polymerization of the vinyl compound the viscosity can be adjusted by addition of a highly viscous substance. Such highly viscous substance can be a "wax", such as an oil or a mixture of an oil with a solid or highly viscous substance (oil-grease). The viscosity of such a viscous substance is usually 1.000 to 15.000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerized vinyl compounds contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10, preferably less than 3, more preferably about 0.1 to 2.0, and in particular about 0.1 to 1.5. It should be noted that no benefits are achieved by using vinyl compounds in excess.

Further, the reaction time of the catalyst modification by polymerization of a vinyl compound should be sufficient to allow for complete reaction of the vinyl monomer, i.e. the polymerization is continued until the amount of unreacted vinyl compounds in the reaction mixture (including the polymerization medium and the reactants) is less than 0.5 wt %, in particular less than 2000 ppm by weight (shown by analysis). Thus, when the prepolymerized catalyst contains a maximum of about 0.1 wt-% vinyl compound, the final vinyl compound content in the polypropylene will be below the limit of determination using the GCMS method (<0.01 ppm by weight). Generally, when operating on an industrial scale, a polymerization time of at least 30 minutes is required, preferably the polymerization time is at least 1 hour and in particular at least 5 hours. Polymerization times even in the range of 6 to 50 hours can be used. The modification can be done at temperatures of 10 to 60° C., preferably 15 to 55° C.

According to the present invention, preferably nucleated high-rigidity propylene polymers are obtained when the modification of the catalyst is carried out in the presence of strongly coordinating external donors.

General conditions for the modification of the catalyst are disclosed in WO 00/6831. The preferred embodiments as described previously in the present application with respect to the vinyl compound also apply with respect to the polymerization catalyst of the present invention and the preferred polypropylene copolymers in accordance with the present invention.

Suitable media for the modification step include, in addition to oils, also aliphatic inert organic solvents with low viscosity, such as pentane and heptane. Furthermore, small amounts of hydrogen can be used during the modification. Therefore, a process for the production of a heterophasic propylene copolymer (HECO) of the present invention is also an object of the present invention.

The process according to the present invention comprises the following stages (i) and (ii) in any sequence:

(i) preparation of the matrix phase of the heterophasic propylene copolymer of the polypropylene composition, wherein stage (i) comprises the following steps:

B2) polymerisation of propylene to afford a propylene homopolymer, or the co-polymerisation of propylene with an alpha-olefin comonomer to result in a propylene copolymer, step B2 being conducted in at least one slurry phase reactor, and optionally B3) polymerisation of propylene to afford a propylene homopolymer, or the co-polymerisation of propylene with an alpha-olefin comonomer to result in a propylene copolymer, step B3 being conducted in at least one gas phase reactor, (ii) preparation of the disperse phase of the heterophasic propylene copolymer of the polypropylene composition, wherein stage (ii) comprises the following step:

B4) co-polymerisation of propylene with an alpha-olefin comonomer to result in an olefin-propylene copolymer, step B4 being conducted in at least one gas phase reactor, and wherein:

a) the process B2 is conducted at a reactor temperature of between 70 and 110° C., b) the process B3 is conducted at a reactor temperature of between 70 and 110° C., and c) the process B4 is conducted at a reactor temperature of between 70 and 110° C.

Such a process may preferably comprise the following stages (i) and (ii) in any sequence:

(i) preparation of the matrix phase of the heterophasic propylene copolymer of the polypropylene composition, wherein stage (i) comprises the following step:

B2) polymerisation of propylene to afford a propylene homopolymer, step B2 being conducted in at least one slurry phase reactor, and (ii) preparation of the disperse phase of the heterophasic propylene copolymer of the polypropylene composition, wherein stage (ii) comprises the following step:

B3) co-polymerisation of propylene with an alpha-olefin comonomer to result in an olefin-propylene copolymer, step B3 being conducted in at least one gas phase reactor, and wherein:

a) the process B2 is conducted at a reactor temperature of between 70 and 110° C., and b) the process B3 is conducted at a reactor temperature of between 70 and 110° C., wherein the olefin-propylene copolymer produced in step B3) may be blended with the heterophasic propylene copolymer (A) by mechanical blending or by in situ-polymerization in any order.

Such a process may preferably comprise the polymerization of propylene in the presence of a) a Ziegler-Natta catalyst (ZN-C) comprising compounds (TC) of a transition metal of Group 4 to 6 of the IUPAC Periodic Table of Elements, a Group 2 metal compound (MC) and an internal donor (ID), wherein said internal donor (ID) is a non-phthalic compound, preferably is a non-phthalic acid ester, b) a co-catalyst (Co), and c) optionally an external donor (ED), and d) optionally introducing the alpha-nucleating agent.

(D) Polypropylene Composition

The polypropylene composition may preferably comprise 75.0 to 100.0 wt. %, preferably 77 to 93 wt. %, more preferably 80 to 93 wt. %, based on the total amount of the composition, of the above heterophasic propylene copolymer (HECO). Accordingly, in preferred embodiments, a nucleating agent may amount to 0 to 25.0 wt. %, more preferably 7 to 23 wt. %, even more preferably 7 to 20 wt. %, based on the total amount of the composition.

The polypropylene composition according to the present invention may comprise apart from propylene also a comonomer. In this case the term "polypropylene composition" according to the present invention is understood as a polypropylene comprising preferably propylene and a comonomer being selected from ethylene and $C_4$ to $C_{10}$ alpha-olefins, like butene or hexene. Preferably, the comonomer is ethylene. The total comonomer content of the polypropylene composition may be in the range of 2.5 to 15.0 wt. %, more preferably in the range of 3.0 to 12.0 wt. %, like in the range of 4.0 to 10 wt. %.

The polypropylene composition in accordance with the present invention has a melt flow rate ($MFR_2$) as measured in accordance with ISO 1133 at 230° C. and 2.16 kg load in the range of 25 to 500 g/10 min, preferably in the range of 25 to 400 g/10 min, like in the range of 30 to 300 g/10 min. Even more preferably, the $MFR_2$ is in the range of 30-250 g/10 min, like 30-200 g/10 min.

(D) Articles

The present invention is primarily concerned with a molded article comprising the above described heterophasic polypropylene composition. The main end-uses for such molded articles are in packaging applications like thin-wall packaging for frozen or fresh food, adhesives, cosmetics or pharmaceuticals. Other end-uses are plastic containers and household articles, but also medical products, rigid packaging like detergent cartons, cup and plate boards for oven or microwave use or sterilizable food packaging, especially for deep freeze or refrigerator uses. The present invention provides the specific advantage that such articles may be produced with lower wall thicknesses without expense in the flowability of the polypropylene compositions and still having excellent impact and toughness properties. Furthermore, the stiffness/impact/toughness balance of the articles produced with the heterophasic polypropylene composition of the present invention is excellent.

The articles may be produced by any common conversion process suitable for thermoplastic polymers, like injection molding, extrusion blow molding, injection stretch blow molding or cast film extrusion.

The articles according to the present invention preferably exhibit a tensile modulus, determined according to ISO 527-2:2012-06 (cross head speed: 1 mm/min.), in the range of from 1200 to 2200 MPa, more preferably from 1300 to 2000 MPa.

The articles according to the present invention may preferably further exhibit a Charpy notched impact strength at 23° C., determined according to ISO 179 1 eA, of from 5.5 to 15.0 kJ/m², more preferably in the range of from 5.6 to 10.0 kJ/m², even more preferably in the range of from 6.0 to 8.0 kJ/m².

Due to the superior crystallization and nucleation characteristics of the polypropylene compositions described above the articles according to the present invention exhibit excellent shrinkage and warpage properties.

Thus, the articles according to the present invention preferably exhibit shrinkage in flow direction (FD) in the range of from 1.0 to 1.6%, more preferably in the range of from 1.1 to 1.6%, determined according to a method described in the experimental section and or shrinkage across flow direction (AF) preferably in the range of from 1.2 to 1.8%, more preferably in the range of from 1.3 to 1.8%, determined according to a method described in the experimental section.

The articles of the present invention may further exhibit reduced warpage. Warpage was determined according IPC-TM-650, number 2.4.22, as described in the method section below.

Experimental Part

A. Measuring Methods

The following definitions of terms and determination methods apply for the above general description of the invention including the claims as well as to the below examples unless otherwise defined.

(i) Quantification of Microstructure by NMR Spectroscopy

Quantitative nuclear-magnetic resonance (NMR) spectroscopy was used to quantify the isotacticity and regioregularity of the propylene homopolymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$, respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V. et al., Macromolecules 30 (1997) 6251). Standard single-pulse excitation was employed utilising the NOE and bi-level WALTZ16 decoupling scheme (Zhou, Z. et al., J. Mag. Reson. 187 (2007) 225; Busico, V. et al., Rapid Commun. 2007, 28, 11289). A total of 8192 (8 k) transients were acquired per spectra.

Quantitative $^{13}C\{^1H\}$ NMR spectra were processed, integrated and relevant quantitative properties determined from the integrals using proprietary computer programs. For propylene homopolymers all chemical shifts are internally referenced to the methyl isotactic pentad (mmmm) at 21.85 ppm. Characteristic signals corresponding to regio defects (Resconi, L., et al., Chem. Rev. 2000, 100, 1253; Wang, W-J., Zhu, S., Macromolecules 33 (2000), 1157; Cheng, H. N., Macromolecules 17 (1984), 1950) or comonomer were observed. The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., et al., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

$$[\text{mmmm}]\% = 100 * (\text{mmmm/sum of all pentads})$$

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., et al., Chem. Rev. 2000, 100, 1253).

The amount of 2,1 erythro regio-defects was quantified using the average integral of the two characteristic methyl sites at 17.7 and 17.2 ppm:

$$P_{21e} = (I_{e6} + I_{e8})/2$$

The amount of 1,2 primary inserted propene was quantified based on the methyl region with correction undertaken for sites included in this region not related to primary insertion and for primary insertion sites excluded from this region:

$$P_{12} = I_{CH3} + P_{12e}$$

The total amount of propene was quantified as the sum of primary inserted propene and all other present regio-defects:

$$P_{total} = P_{12} + P_{21e}$$

The mole percent of 2,1 erythro regio-defects was quantified with respect to all propene:

$$[21e] mol.\text{-}\% = 100*(P_{21e}/P_{total})$$

(ii) Comonomer Determination by NMR Spectroscopy

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., et al., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., et al., J. Mag. Reson. 187 (2007) 225; Busico, V., et al., Macromol. Rapid Commun. 2007, 28, 1128). A total of 6144 (6 k) transients were acquired per spectra.

Quantitative 13C{1H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950).

With characteristic signals corresponding to 2,1 erythro regio defects observed (as described in L. Resconi, L. et al., Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the region-defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the 13C{1H} spectra. This method was chosen for its robust nature and ability to account for the presence of regio-defects when needed. Integral regions were slightly adjusted to increase applicability across the whole range of encountered comonomer contents. For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + 0.5(S\delta\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[mol\ \%] = 100*fE$$

The weight percent comonomer incorporation was calculated from the mole fraction:

$$E[wt\ \%] = 100*(fE*28.06)/((fE*28.06) + ((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

(iii) Melt Flow Rate (MFR)

The melt flow rates MFR$_2$ are measured with a load of 2.16 kg at 230° C. for propylene copolymers. The melt flow rate is the quantity of polymer in grams which the test apparatus standardised to ISO 1133 extrudes within 10 minutes at a temperature of 230° C. under a load of 2.16 kg. The MFR$_2$ of a fraction (B) produced in the presence of a fraction (A) is calculated using the measured values of MFR$_2$ of fraction (A) and the mixture received after producing fraction (B) ("final"):

$$Log(MFR_{final}) = weight\ fraction(A)*Log(MFR_A) + weight\ fraction(B)*Log(MFR_B)$$

(iv) Xylene Soluble Fraction (XCS, Wt %)

The amount of the polymer soluble in xylene is determined at 25° C. according to ISO 16152; 5. edition; 2005-07-01.

(v) Intrinsic Viscosity (iV)

The intrinsic viscosity (iV) value increases with the molecular weight of a polymer. The iV values e.g. of the XCS were measured according to ISO 1628/1 in decalin at 135° C.

(vi) DSC Analysis, Melting Temperature (Tm), Melting Enthalpy (Hm), Crystallization Temperature (Tc) and Crystallization Enthalpy (Hc)

These properties were measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature (Tc) and crystallization enthalpy (Hc) are determined from the cooling step, while melting temperature (Tm) and melting enthalpy (Hm) are determined from the second heating step, respectively, from the first heating step in case of the webs.

(vii) Fast Scanning Calorimetry (FSC), Crystallization Temperature (Tc), Half-Time of Crystallization ($t_{1/2}$)

Fast scanning calorimeter was used to quantify the Tc at rapid cooling and the $t_{1/2}$ in a broad ranges of temperatures. Fast scanning chip calorimetry was done using a power-compensation Flash DSC 1 instrument for Mettler-Toledo. Samples were prepared by microtoming to obtain thin sections with a thickness of about 20 μm, and reduction of their lateral size to 50-100 μm, using a knife and a stereo-microscope. For each sample, a new sensor was employed. Before loading of the sample onto the sensor, the latter was conditioned and temperature-corrected according to the instrument-provider recommendation. Detailed information about the instrument and its performance is given in: [S. van Herwaarden, E. Iervolino, F. van Herwaarden, T. Wijffels, A. Leenaers, V. Mathot, Design, performance and analysis of thermal lag of the UFS1 twin-calorimeter chip for fast scanning calorimetry using the Mettler-Toledo Flash DSC 1, Thermochim. Acta 522 (2011) 46-52 V. Mathot, M. Pyda, T. Pijpers, G. Vanden Poel, E. van de Kerkhof, S. van Herwaarden, F. van Herwaarden, A. Leenaers, The Flash DSC 1, a power compensation twin-type, chip-based fast scanning calorimeter (FSC): First findings on polymers, Thermochim. Acta 522 (2011) 36-45]. In order to measure the Tc, the samples were heated to 200° C., equilibrated at this temperature for 0.5 s and then cooled at different rate between 1 and 5.000 K/s to −60° C. Subsequently, the samples were heated to 200° C. In order to measure the $t_{1/2}$ the samples were heated to 200° C., equilibrated at this temperature for a period of time of 0.5 s and then cooled at a rate of 2.000 K/s to pre-defined isothermal crystallization temperatures between 0 and 125° C. After isothermal crystallization, the sample was melted, to then begin the next crystallization experiment at a 2.5° C. lower temperature.

(viii) Shrinkage Behavior

Shrinkage in flow and shrinkage cross flow were determined on film gate injection moulded articles. One is a circular sector (radius 300 mm and opening angle of 20°) and the other one a stripe (340×65 mm). 2.8 mm thick specimen were injection molded at the same time at a back pressure of 400 bar. The melt temperature is 240° C. and the temperature of the tool 25° C., respectively. Average flow front velocity is 3.5±0.2 mm/s. After the injection molding process the shrinkage of the specimens is measured at 23° C. and 50% humidity. The measurement was done 96 hours after the injection molding.

(ix) Warpage

Warpage characteristics were determined according to IPC-TM-650, number 2.4.22. Warpage is the distortion, where the surface of the molded part does not follow the intended shape of the design. The warpage was determined by the deviation in mm of an injection molded sample from a flat surface. This deviation was recorded in the middle ($\Delta_m$) and at the edge ($\Delta_e$) of the sample.

Accordingly, an elliptic sample (cover lid) was subjected to bow and twist measurement (percentage) at the diagonal axis, declined at 45° to both of the major axes. The length of the diagonal was 11 cm.

Warp is determined as the percentage K of the deflection (tk) relative to the length (L) of the curved edge:

$$K=tk/L*100\%,$$

as shown in FIG. 1. If the warp occurs both lengthwise and crosswise, the largest value counts. Twist is determined as the percentage V of the deflection (tv) relative to the length (D) of the diagonal:

$$V=tv/D*100\%,$$

as also shown in FIG. 1.

Figure 2:
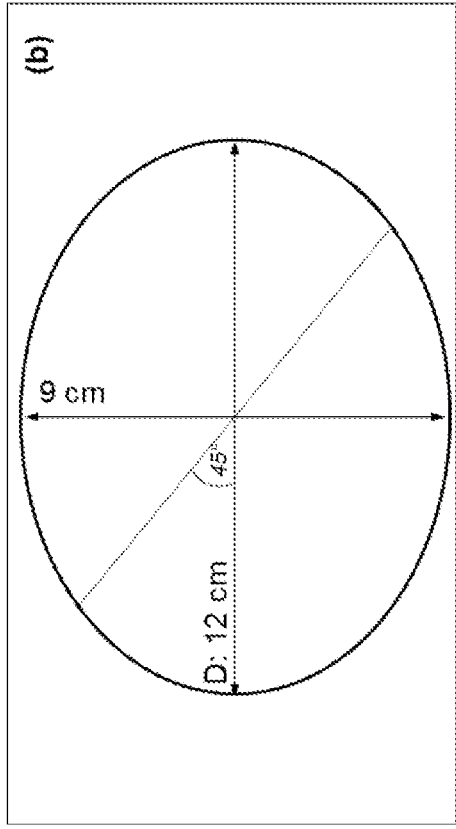
FIG. 2 is a schematic representation of warpage results shown in side view (a) and top view (b) of the samples according to inventive examples 1 and 2 (IE1, IE2) and the comparative example 1 (CE1) with the corresponding dimensions.
Figure 2:
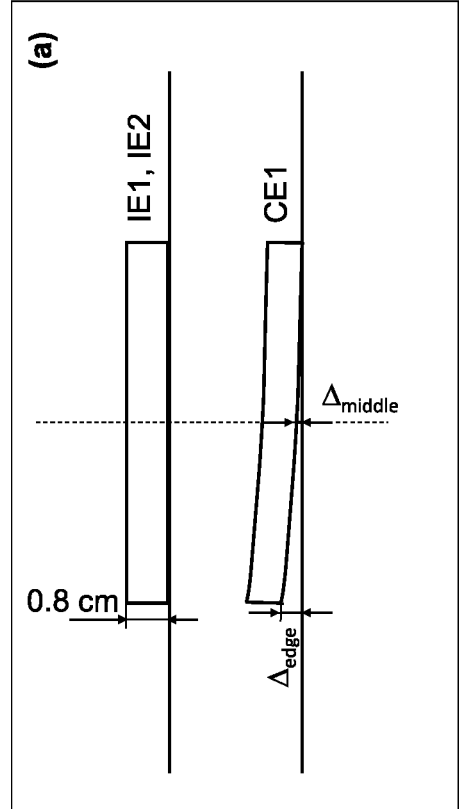

A schematic representation of the side view (a) and top view (b) of the samples examined in inventive examples 1 and 2 (IE1, IE2) and in comparative example 1 (CE1) with the corresponding dimensions and diagonal axis for warpage measurements is shown in FIG. 2(a) and FIG. 2(b), respectively.

(x) Charpy Notched Impact Strength

Charpy notched impact is measured according to ISO 179/1 eA at +23° C. and at −20° C. using an injection molded test specimen (80×10×4 mm) as produced according to ISO 1873.

(xi) Tensile Properties

Tensile properties were determined according to ISO 527-2 on injection ISO multi-purpose molded specimens prepared in accordance with EN ISO 1873-2.

Tensile modulus (in MPa) was determined according to ISO 527-2. The measurement was conducted at 23° C. with an elongation rate of 1 mm/min.

B. Examples

Two different heterophasic propylene copolymer compositions (PP1 and PP2) were prepared as described in Table 1 below. Properties of the compositions are shown in Table 2 below.

The heterophasic propylene copolymers (HECO) were prepared in the presence of a catalyst system modified by polyvinylcyclohexane (PVCH) as the nucleation agent in the following manner.

(a) Catalyst Preparation

The preparation of the catalyst as well as the modification with PVCH was performed as disclosed in WO 2016/055361, for Inventive Example 1 in chapter 1a) Catalyst preparation.

(b) VCH Modification of the Catalyst

The modification of the catalyst with PVCH was performed as disclosed in WO 2016/055361, for Inventive Example 1 in chapter 1b) VCH modification of the catalyst.

(c) Polymerisation

The polymerisation of the heterophasic propylene copolymers was conducted under the conditions given in Table 1 below.

TABLE 1

| | IE1 PP1 | IE2 PP2 |
|---|---|---|
| TEAL/Ti [mol/mol] | 144 | |
| TEAL/Donor [mol/mol] | 7.6 | |
| Prepolymerization | | |
| Temperature [° C.] | 30 | 30 |
| Residence time [h] | 0.37 | 0.38 |
| Loop R1 | | |
| R1 Temperature [° C.] | 80 | 80 |
| R1 pressure [bar] | 53 | |
| R1 Residence time [h] | 0.25 | |
| R1 H2/C3 ratio [mol/kmol] | 25.4 | 5.9 |
| R1 C2/C3 ratio [mol/kmol] | 0 | 0.8 |
| R1 Split [%] | 40 | 47 (35)* |
| R1 MFR2 [g/10 min] | 310 | 44 |
| R1XCS [wt %] | 2.6 | 1.0 |
| GPR1 R2 | | |
| R2 Temperature [° C.] | 80 | 80 |
| R2 pressure [bar] | 27 | |
| R2 Residence time [h] | 3.1 | |
| R2 C2/C3 ratio [mol/kmol] | 0 | 0.1 |
| R2 H2/C3 ratio (mol/kmol) | 147.3 | 66.7 |
| R2 split [%] | 40 | 53 (39)* |
| R2 MFR2 [g/10 min] | 204 | 41 |
| R2 XCS [wt. %] | 2.4 | 2.0 |
| R2 Ethene content [wt. %] | 0 | |
| GPR2 R3 | | |
| R3 Temperature (° C.) | 75 | 75 |
| R3 Pressure [bar] | 25 | |
| R3 Residence time [h] | 1.2 | |
| R3 C2/C3 ratio [mol/kmol] | 401.6 | 606 |
| R3 H2/C2 ratio [mol/kmol] | 158.8 | 130 |
| R3 split [%] | 20 | 36 (26)* |
| R3 MFR2 [g/10 min] | 80 | 18 |
| R3 XCS [wt. %] total | 20 | 21 |
| R3 C2 [wt %] | 8.4 | 10 |
| GPR3 R4 | | |
| R4 Temperature (° C.) | | |
| R4 Pressure [bar] | | |
| R4 Residence time [h] | | |
| R4 C2/C3 ratio [mol/kmol] | | |
| R4 H2/C2 ratio [mol/kmol] | | |
| R4 split [%] | | |

*In IE2 the split values given for loop/R1 and GPR1/R2 sum up to 100% and the split value for GPR2/R3 is added subsequently. The values in brackets are calculated, based on a total of 100% for the components produced in R1 + R2 + R3.

TABLE 2

| | Properties of HECOs | | |
|---|---|---|---|
| Parameters | Units | IE1 | IE2 |
| matrix | | unimodal | unimodal |
| disperse phase | | unimodal | unimodal |
| XCS content | wt. % | 20 | 18 |
| ethylene content (XCS) | wt. % | 36 | 45 |
| IV in XCS | dl/g | 2.8 | 2.7 |
| MFR2 | g/10 min | 70 | 20 |

The catalyst used in the polymerization processes for producing CE1 was a commercial ZN180 polymerisation catalyst of Basell with triethyl aluminum (TEA) as co-catalyst and dicyclopentyl dimethoxysilane (donor D) as donor. The Al/donor ratio was 5 mol/mol, and the Al/Ti ratio was 200 mol/mol.

The catalyst used in the polymerization processes for producing IE1 and IE2 was described under a) and b) above.

The resulting polymer powders were compounded in a co-rotating twin-screw extruder Coperion ZSK 57 at 220° C. with 0.2 wt.-% of Irganox B225 (1:1-blend of Irganox 1010 (Pentaerythrityltetrakis(3-(3',5'-di-tert.butyl-4-hydroxy-toluyl)-propionate and tris (2,4-di-t-butylphenyl) phosphate) phosphite) of BASF AG, Germany) and 0.1 wt.-% calcium stearate.

The properties of the obtained compositions are shown in Table 3 below.

TABLE 3

| | Units | IE1 | IE2 | CE1 |
|---|---|---|---|---|
| PVCH | ppm | 23.7 | 21-25 | 21-25 |
| Isotacticity | mm | 98 | nm | 97 |
| t ½ at 80° C. | s | 0.017 | 0.015 | 0.030 |
| t ½ at 40° C. | s | 0.040 | 0.035 | 0.045 |
| MFR2 | g/10 min | 68 | 20 | 63 |
| TM | MPa | 1500 | 1480 | 1485 |
| Charpy NIS (23° C.) | kJ/m² | 7.4 | 7.0 | 5.3 |
| Shrinkage sector in flow | % | 1.4 | | 1.37 |
| Shrinkage sector across flow | % | 1.65 | | 1.59 |
| Warpage | | ok | ok | not ok |
| $\Delta_m$ | mm | 0 | 0 | 2 |
| $\Delta_e$ | mm | 5 | 0 | 4 |
| $\Delta_m$ | % | 0 | 0 | 3.6 |
| $\Delta_e$ | % | 4.5 | 0 | 3.6 |

It can be seen from the data in Table 2 above that articles prepared with the polypropylene compositions according to the present invention provide improved stiffness/impact balance, and improved warpage properties, shrinkage behavior is at an acceptable level. FIG. 2(a) shows an injection molded article without warpage (IE1, IE2) and an injection molded article with warpage (CE1).

In particular, the inventive compositions and articles exhibit decreased half-time crystallization times t½, yielding very low or no warpage, determined according to IPC-TM-650. This results in shorter cycle times and excellent dimensional stability of the obtained articles. Moreover, the articles of the present invention exhibit high stiffness (high tensile modulus) and desirable impact strength (Charpy notched impact values).

The invention claimed is:

1. An article comprising a polypropylene composition comprising
   a heterophasic propylene copolymer which comprises:
   a) a matrix phase (A) comprising at least one propylene homopolymer and/or a propylene copolymer, and
   b) a disperse phase (B) comprising a propylene copolymer rubber dispersed in the matrix phase (A), wherein
   the propylene copolymer rubber of the disperse phase (B) has a comonomer content of 30 to 55 wt. %,
   wherein the weight ratio of the matrix phase (A) and the disperse phase (B) is from 20:80 to 80:20;
   wherein an intrinsic viscosity (IV) of a xylene cold solubles fraction (XCS) of the heterophasic propylene copolymer is from 2.0 to 4.5 dl/g; and
   the polypropylene composition has:
   (i) a melt flow rate MFR2 of 1 g/10 min to 500 g/10 min, determined according to ISO 1133 (230° C., 2.16 kg load); and
   the article has:
   (ii) a half-time of crystallisation t1/2 of 1 to 20 msec, measured at 80° C. by fast scanning calorimeter as described in the specification.

2. The article according to claim 1, wherein the comonomer of the propylene copolymer rubber of the disperse phase (B) of the heterophasic propylene copolymer is an ethylene or a C4 to C10 alpha-olefin or any combination thereof.

3. The article according to claim 1, wherein the total comonomer content of the heterophasic propylene copolymer is from 2.5 to 15.0 wt. %, determined by FTIR calibrated with 13C-NMR.

4. The article according to claim 1, wherein the propylene copolymer rubber of the disperse phase (B) of the heterophasic propylene copolymer is a unimodal or bimodal composition.

5. The article according to claim 1, wherein the heterophasic propylene copolymer is nucleated with a nucleating agent, wherein the nucleating agent optionally is a polymeric vinyl alkane.

6. The article according to claim 1, wherein the amount of xylene cold solubles (XCS) of the heterophasic propylene copolymer is in the range of from 10 to 30 wt. %, determined according to ISO 16152:2005.

7. The article according to claim 1, wherein the heterophasic propylene copolymer has a melting temperature (Tm) in the range of from 161 to 167° C. and/or a crystallization temperature (Tc) of greater than 125° C., Tm and Tc being measured by differential scanning calorimetry (DSC).

8. The article according to claim 1, which has a tensile modulus, determined according to ISO 527-2:2012-06 (cross head speed: 1 mm/min.), in the range of from 1200 to 2200 MPa.

9. The article according to claim 1, which has a Charpy notched impact strength at 23° C., determined according to ISO 179 1 eA, of 5.5 to 15.0 kJ/m2.

10. A process for preparing a polypropylene composition as defined in claim 1, comprising the following stages (i) and (ii) in any sequence:

(i) preparation of the matrix phase of the heterophasic propylene copolymer of the polypropylene composition, wherein stage (i) comprises the following steps:

B2) polymerisation of propylene to afford a propylene homopolymer, or the co-polymerisation of propylene with an alpha-olefin comonomer to result in a propylene copolymer, step B2 being conducted in at least one slurry phase reactor, and optionally B3) polymerisation of propylene to afford a propylene homopolymer, or the co-polymerisation of propylene with an alpha-olefin comonomer to result in a propylene copolymer, step B3 being conducted in at least one gas phase reactor, (ii) preparation of the disperse phase of the heterophasic propylene copolymer of the polypropylene composition, wherein stage (ii) comprises the following step:

B4) co-polymerisation of propylene with an alpha-olefin comonomer to result in an olefin-propylene copolymer, step B4 being conducted in at least one gas phase reactor, and wherein:

a) the process B2 is conducted at a reactor temperature of between 7° and 110° C., b) the process B3 is conducted at a reactor temperature of between 7° and 110° C., and c) the process B4 is conducted at a reactor temperature of between 7° and 110° C.

11. The process according to claim 10, wherein the polypropylene composition has been polymerised in presence of a) a Ziegler-Natta catalyst (ZN-C) comprising compounds (TC) of a transition metal of Group 4 to 6 of the IUPAC Periodic Table of Elements, a Group 2 metal compound (MC) and an internal donor (ID), wherein said internal donor (ID) is a non-phthalic compound, b) a co-catalyst (Co), and c) optionally an external donor (ED).

12. The process according to claim 10, wherein the internal donor (ID) is selected from the group consisting of optionally substituted malonates, maleates, succinates, glutarates, cyclohexene-1,2-dicarboxylates, benzoates and derivatives and/or mixtures thereof.

13. The process according to claim 10, wherein after step B4, stage (ii) further comprises a step B5):

B5) co-polymerisation of propylene with an alpha-olefin comonomer to result in an olefin-propylene copolymer.

14. A method for producing an article, comprising molding the polypropylene composition as defined in claim 1, to produce the article.

15. The method of claim 14, wherein the article is a thin wall molded article.

16. The method of claim 14, wherein the molding is injection molding.

17. The article according to claim 5, wherein the nucleating agent is a polymeric vinyl cycloalkane in which the monomeric unit is selected from the group consisting of vinyl cyclohexane, vinyl cyclopentane, vinyl-2-methyl-cyclohexane, and a mixture thereof.

* * * * *